US012467307B2

(12) United States Patent
Atonal

(10) Patent No.: US 12,467,307 B2
(45) Date of Patent: Nov. 11, 2025

(54) MOVABLE BARRIER SYSTEMS AND METHODS ASSOCIATED WITH MOVABLE BARRIER SYSTEMS

(71) Applicant: The Chamberlain Group LLC, Oak Brook, IL (US)

(72) Inventor: Jorge Castrejon Atonal, Sonora (MX)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 0 days.

(21) Appl. No.: 18/431,352

(22) Filed: Feb. 2, 2024

(65) Prior Publication Data

US 2025/0250844 A1 Aug. 7, 2025

(51) Int. Cl.
*E05F 15/686* (2015.01)

(52) U.S. Cl.
CPC ....... *E05F 15/686* (2015.01); *E05Y 2201/652* (2013.01); *E05Y 2201/66* (2013.01); *E05Y 2900/106* (2013.01)

(58) Field of Classification Search
CPC ..... E05F 15/686; E05F 15/603; E05F 15/681; E05F 15/00; E05F 15/60; E05F 15/688; E05Y 2900/106
USPC ..................................................... 49/197–199
See application file for complete search history.

(56) References Cited

U.S. PATENT DOCUMENTS

| | | | | |
|---|---|---|---|---|
| 4,356,668 A * | 11/1982 | Wagner | E06B 9/02 | 49/31 |
| 4,493,164 A * | 1/1985 | Wagner | E05F 15/686 | 49/31 |
| 4,885,872 A * | 12/1989 | Chang | F16G 1/00 | 49/362 |
| 5,010,688 A * | 4/1991 | Dombrowski | E05F 15/681 | 49/362 |
| 6,188,198 B1 * | 2/2001 | Gunton | E05F 15/686 | 320/117 |
| 8,033,374 B2 * | 10/2011 | Gunton | E05F 15/603 | 160/331 |
| 8,182,381 B2 * | 5/2012 | Gunton | E06B 9/70 | 160/310 |
| 8,578,653 B2 * | 11/2013 | Hawkins | E05F 15/681 | 49/197 |
| 9,752,369 B2 * | 9/2017 | Bresson | E05F 15/60 | |
| 2007/0144687 A1 * | 6/2007 | Griebel | E05D 13/1261 | 160/201 |
| 2008/0127558 A1 * | 6/2008 | Gunton | E05F 15/668 | 49/139 |
| 2012/0300935 A1 * | 11/2012 | Bresson | E05F 15/686 | 380/274 |

* cited by examiner

*Primary Examiner* — Justin B Rephann
(74) *Attorney, Agent, or Firm* — Dority & Manning, P.A.

(57) ABSTRACT

Movable barrier systems, driving assemblies for movable barrier systems, and methods associated with movable barrier systems are provided. A driving assembly for a movable barrier system includes a belt; a cable coupled to the belt; and a guide component disposed adjacent to a first interface between the cable and the belt.

19 Claims, 8 Drawing Sheets

MOVABLE BARRIER SYSTEMS AND METHODS ASSOCIATED WITH MOVABLE BARRIER SYSTEMS

FIELD

The present disclosure relates generally to movable barrier systems, and more particularly to driving assemblies for moveable barrier systems.

BACKGROUND

Moveable barrier operators, such as garage door openers, are frequently used to secure areas, such as garages. The movable barrier operator drives a movable barrier, such as a garage door, between two end positions, e.g., an open position and a closed position, to provide selective access to the secured area. Traditionally, the movable barrier operator is operably coupled with the movable barrier through an endless loop formed from a belt or a chain. The endless loop is wrapped around a drive pulley or gear associated with the movable barrier operator and interfaces with a trolley. As the drive pulley is driven by a motor of the movable barrier operator, the endless loop moves the trolley along a rail to raise and lower the movable barrier.

Endless loops traditionally have non-variable constructions, formed from a single linear member, such as a chain or rubber coated belt, wrapped around into a circle or other shape, and one end of the linear member attached to another end of the linear member to form a loop. The endless loop must be constructed in a way such that it does not slip relative to the drive pulley. Often, this is achieved using a belt with a large amount of grip or a toothed surface that matches the surface profile of the drive pulley. These solutions all require significant material resources, some of which are environmentally sensitive and costly.

Accordingly, improved systems and methods of driving movable barriers are desired in the art. In particular, driving assemblies that provide the same quality of operation as traditional belt endless loops without exploiting environmentally sensitive resources while having reduced manufacturing cost would be advantageous.

BRIEF DESCRIPTION

In accordance with the present disclosure various aspects and embodiments will be set forth in part in the following description.

In accordance with one embodiment, a driving assembly configured to be driven by a movable barrier operator to adjust a relative position of a movable barrier is provided. The driving assembly includes a belt; a cable coupled to the belt; and a guide component disposed adjacent to a first interface between the cable and the belt.

In accordance with another embodiment, a movable barrier system is provided. The movable barrier system includes a movable barrier operator including a drive pulley; a movable barrier; a rail extending between the movable barrier operator and the movable barrier; a trolley moveable along the rail and coupled to the movable barrier; and a driving assembly driven by the drive pulley, the driving assembly comprising: a belt; a cable coupled to the belt; and a guide component disposed adjacent to a first interface between the cable and the belt, wherein the guide component includes at least one of: a guide surface that guides the guide component past an interactable feature when the belt is in the normal operating state and the drive pulley is driven, or an adjustment surface that adjusts the belt from a twisted operating state to a normal operating state as the driving assembly is driven by the drive pulley.

In accordance with another embodiment, a method of operating a driving assembly to adjust a position of a movable barrier is provided. The method includes operating a movable barrier operator to move the driving assembly, which comprises an endless loop defined by a belt, a cable, and a guide component disposed at a first interface between the belt and the cable; and passing the guide component by an interactable feature in a first direction such that an adjustment surface of the guide component interacts with the interactable feature to adjust the belt from a twisted operating state to a normal operating state.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

The detailed description that follows makes reference to the appended figures, in which.

DETAILED DESCRIPTION

Figure 1:
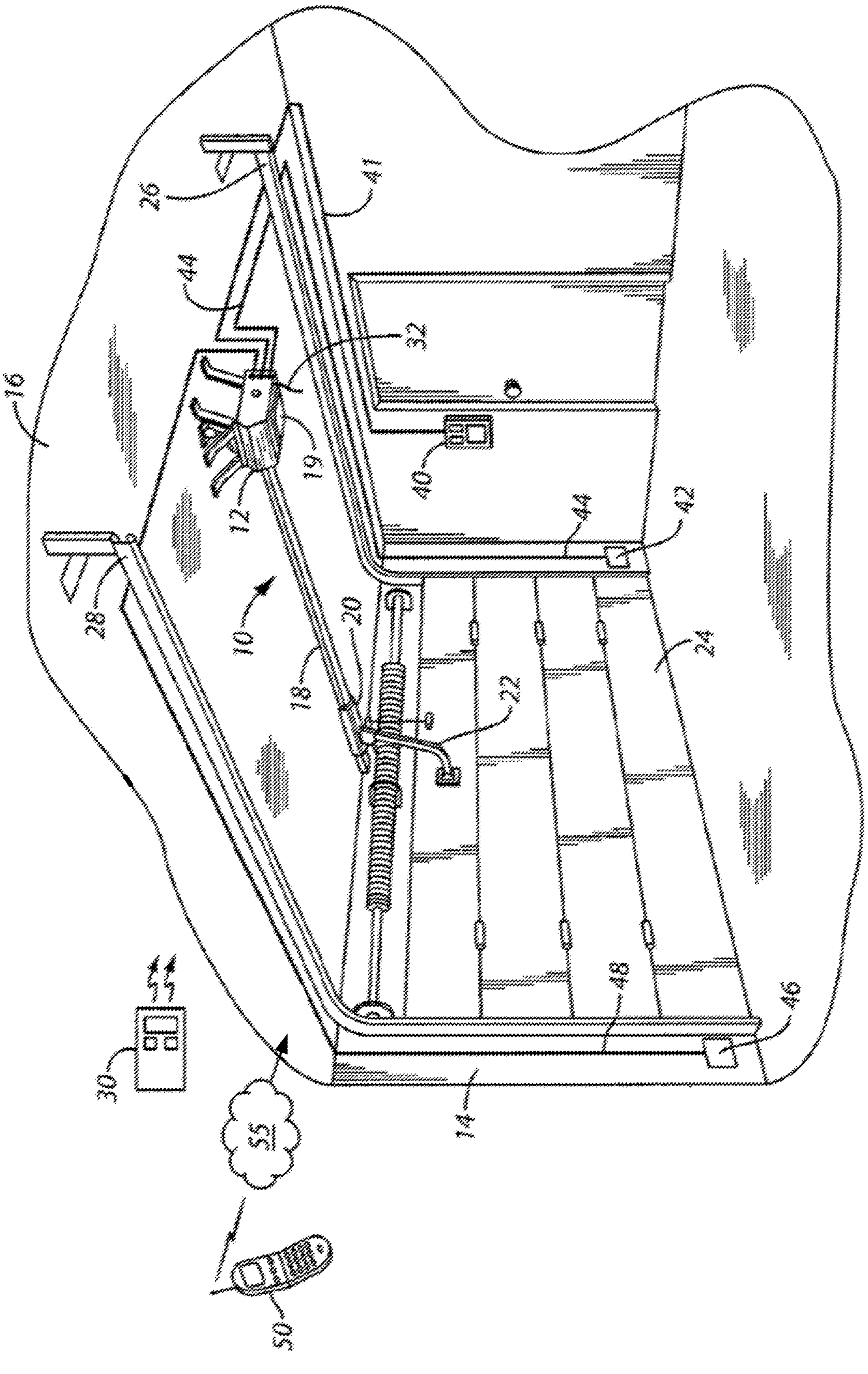
FIG. 1 is a perspective view of a garage including a movable barrier system in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms “first”, “second”, and “third” may be used interchangeably to distinguish one component from another and are not intended to signify location or importance of the individual components. The singular forms “a,” “an,” and “the” include plural references unless the context clearly dictates otherwise. The terms “coupled,” “fixed,” “attached to,” and the like refer to both direct coupling, fixing, or attaching, as well as indirect coupling, fixing, or attaching through one or more intermediate components or features, unless otherwise specified herein. As used herein, the terms “comprises,” “comprising,” “includes.” “including” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

In general, movable barrier systems described herein include movable barrier operators that drive movable barriers, such as garage doors, between multiple positions, such as open and closed positions. The movable barrier operator is coupled to the movable barrier through a combination of a belt and a cable coupled together. Ends of the belt and cable are joined together at, or through, one or more interfaces to form an endless loop. As a result of its multi-piece construction and the interfaces that connect the belt and cable together, the endless loop may become jammed (stuck) at certain points of travel within the movable barrier system or experience twisting due to improper installation or if the movable barrier contacts an object or obstacle in a path of the movable barrier. A guide component is coupled to the endless loop to prevent jamming and twisting. The guide component can further restore the endless loop to its normal (untwisted) operating state in the event of twisting. The guide component includes at least one of a guide surface and an adjustment surface. The guide surface guides the endless loop in the normal operating state. The adjustment surface reorients the endless loop from a twisted operating state to the normal operating state.

Referring now to the drawings, FIG. 1 depicts an example movable barrier system 10 including a movable barrier operator 12, here a head unit of a garage door opener, mounted within a garage 14 and employed for controlling the opening and closing of the movable barrier 24, here a garage door. The movable barrier operator 12 is mounted to the ceiling 16 of the garage 14. The movable barrier operator 12 includes a motor and an operator controller for outputting control signals to and/or controlling electrical power supplied to the motor. The operator controller for the movable barrier system 10 responds to various inputs by starting and stopping the motor, which is used to move the movable barrier 24, and by turning a light 19 on and off. Extending from the movable barrier operator 12 is a rail 18, e.g., a rail with a rectangular cross-sectional profile, having a releasable trolley 20 attached thereto and an arm 22 extending from the trolley 20 and coupled to the movable barrier 24 positioned for movement along a pair of door tracks 26 and 28. The movable barrier operator 12 transfers the garage door 24 between open and closed positions for allowing access to and from the garage 14.

For various purposes, an optical emitter 42 and optical detector 46 are provided. These are coupled to the movable barrier operator 12 by a pair of wires 44 and 48 or through one or more wireless transmission protocols, such as WiFi, Bluetooth, or the like. The emitter 42 and detector 46 are used to sense an object therebetween which interrupts an infrared or other optical beam across the opening between emitter 42 and detector 46. To provide such operation, the controller responds to the detector 46 upon beam interruption and will stop and/or reverse and open the door if an obstruction is sensed in the doorway.

At least one wireless transmitter unit 30 can send signals to one or more antennas 32 positioned in, on, or extending from the movable barrier operator 12. The antenna 32 is coupled to a receiver located within the movable barrier operator 12. A wall mounted wired transmitter 40, which may include any number of actuators such as buttons or switches, is mounted on a wall of the garage 14. The wired transmitter 40 communicates with the movable barrier operator 12 through a direct physical wired connection 41 to the movable barrier operator 12 using any commonly known method of communication, including serial bus communication. A variety of other communication options may be available to allow a user to communicate with and control the movable barrier system 10. By one example, a mobile communication device 50 is configured to send signals through a wireless communication network 55 to the movable barrier operator 12 to control operation of the movable barrier system 10. Mobile communication devices 50 such as mobile phones and other mobile devices are known.

Figure 2:
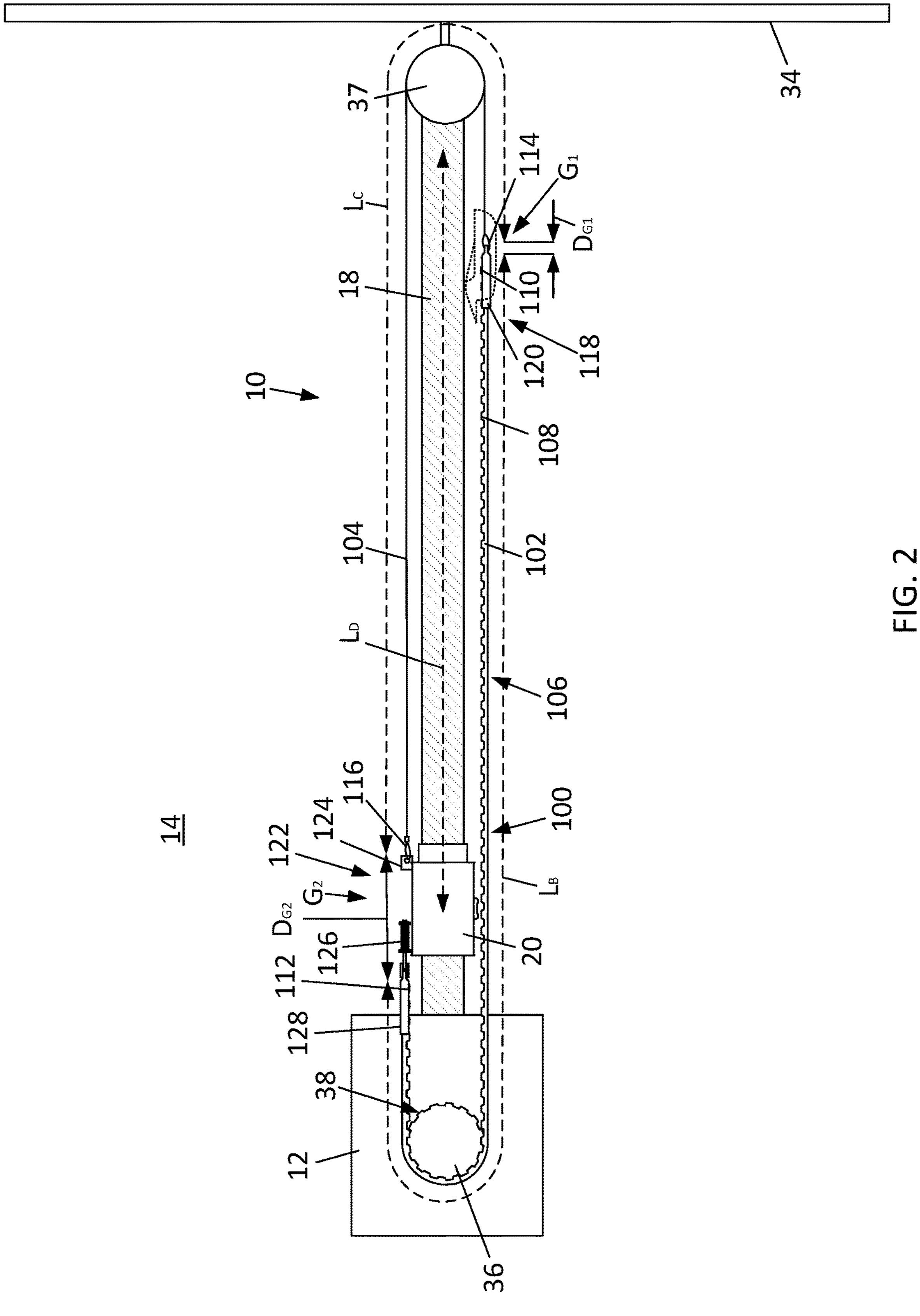
FIG. 2 is a schematic top view of the movable barrier system with a driving assembly of the movable barrier system in a first position in accordance with embodiments of the present disclosure.

FIG. 2 illustrates a schematic view of the movable barrier system 10 as seen from a top view in accordance with an embodiment. The rail 18 extends from the moveable barrier operator 12 to a wall 34. The rail 18 is typically coupled to the wall 34 at a location above the movable barrier 24 or to the ceiling 16 of the garage 14 (FIG. 1). The rail 18 is generally rigid and formed from one or more components that define a track for the trolley 20 to move on. Under normal operating conditions, the rail 18 is straight, or generally straight. However, the rail 18 may bow in certain instances, such as when the movable barrier system 10 is improperly installed or when the movable barrier 24 contacts an obstacle.

The trolley 20 is translatable along the rail 18 between two endpoints. A first of the two endpoints is associated with an open position of the movable barrier 24 and a second of the two endpoints is associated with a closed position of the movable barrier 24. It is noted that these endpoints can be adjusted to properly position the movable barrier 24 at both the open position and the closed position. By way of non-limiting example, adjustment of the endpoints can be performed at the movable barrier operator 12.

The movable barrier operator 12 includes a motor that drives a pulley 36. The pulley 36 is disposed within, on, or extends from the movable barrier operator 12. To raise the movable barrier 24, the pulley 36 is driven by a motor of the movable barrier operator 12 in a first direction. To lower the movable barrier 24, the pulley 36 is driven in a second direction opposite the first direction. The total angular displacement of the pulley 36 to move the movable barrier 24 between the open and closed positions is initially set by the manufacturer and adjusted in situ during installation of the movable barrier system 10 (and optionally during any repairs or maintenance of the movable barrier system 10) by adjusting one or both of the two endpoints of travel for the trolley 20.

The pulley 36 is coupled to the trolley 20 by a driving assembly 100. The driving assembly 100 includes a belt 102 and a cable 104 coupled together, often in situ during installation of the movable barrier system 10, to form an endless loop 106. The belt 102 can be formed from a core material embedded in an outer layer. The core material can include one or more strength members, such as steel wire or filament, that provide strength to the belt 102. The outer layer is formed over the core material. In an embodiment, the outer layer is formed from a polymer material, such as rubber, overmolded on the core material. The belt 102 defines a drive surface 108 that interfaces with a complementary drive surface 38 of the pulley 36 to drive the endless loop 106 and move the trolley 20 along the rail 18. The drive surface 108 includes features such as teeth, castellations, ridges, or apertures equally spaced apart from one another along the length of the belt 102 that interface with complementary teeth, castellations, ridges, or projections of the pulley 36 to rotationally key the endless loop 106 to the pulley 36.

The cable 104 can include an elongated, relatively flexible material such as braided cable formed from a plurality of discrete woven or twisted wires. In an example embodiment, the cable 104 includes 7×7 galvanized aircraft cable with left-hand directional central strands and right-hand directional outer strands. The cable 104 can have a generally uniform composition along its entire length.

The belt 102 defines first and second ends 110 and 112 and the cable 104 defines first and second ends 114 and 116. The first end 110 of the belt 102 is coupled to the first end of the cable 104 at a first interface 118 via a coupling, fastener or hardware 120, such as a belt termination bracket. The belt termination bracket can fit around the first end 110 of the belt and includes engagement features, such as slots, that receive features of the drive surface 108 of the belt 102 to secure the belt termination bracket to the belt 102. The belt termination bracket further includes a cable interfacing feature that interfaces with the first end 114 of the cable 104 to secure the belt termination bracket to the cable 104. In an embodiment, the first interface 118 between the belt 102 and the cable 104 is assembled prior to installing the driving assembly 100 in the movable barrier system 10. For example, the first interface 118 can be assembled by the manufacturer or at another time prior to installation in the movable barrier system 10.

The second end 112 of the belt 102 and the second end 116 of the cable 104 are further coupled together at a second interface 122 to complete the endless loop 106. Assembly of the second interface 122 can occur in situ during installation of the endless loop 106 in the movable barrier system 10. The trolley 20 can be coupled to the endless loop 106 at or near the second interface 122. As depicted in FIG. 2, the trolley 20 can include attachment structures, such as a first attachment structure 124 and a second attachment structure 126, that interface with the second ends 116 and 112 of the cable 104 and the belt 102, respectively. In an embodiment, the second end 116 of the cable 104 can be coupled to the first attachment structure 124, for example, by threading an end of the cable 104 through an opening in the first attachment structure 124 and using a crimp nut to secure the end of the cable 104 back on itself. The second end 112 of the belt 102 can be terminated by hardware 128, such as a belt termination bracket, that interfaces with the second attachment structure 126 of the trolley 20. The second attachment structure 126 can include a tensioner spring assembly that allows for tension adjustment in the endless loop 106.

The endless loop 106 can be installed in the movable barrier system 10 during initial installation of the movable barrier system 10, during a retrofitting operation when an existing drive belt is replaced by the endless loop 106 described herein, or at any other time.

During installation of the endless loop 106 in the movable barrier system 10, the belt 102 is positioned relative to and interfaced with the drive surface 38 of the pulley 36 before tensioning the second attachment structure 126, and optionally before completing assembly of the endless loop 106 at the second interface 122. The belt 102 is further positioned relative to a second (passive) pulley 37. After completing the endless loop 106 and positioning the belt 102 around the pulleys 36 and 37, the tensioner spring assembly of the second attachment structure 126 can be adjusted to tension the endless loop 106 to an ideal tension rating. The movable barrier 24 (FIG. 1) can then be coupled to the trolley 20 and endpoints of the trolley 20 can then be set, for example at the movable barrier operator 12. As the pulley 36 is rotated in either a clockwise or counterclockwise direction, the endless loop 106 is driven, causing the trolley 20 to move along the rail 18 and adjusting the position of the movable barrier 24.

As described above, the endless loop 106 is formed from a plurality of segments, i.e., the belt 102 and the cable 104. The belt 102 is disposed at a location within the endless loop 106 that consistently interfaces with the pulley 36 during use of the movable barrier system 10. The cable 104 is disposed within the endless loop 106 such that the cable 104 does not interact with the pulley 36. Instead, the cable 104 passes around the second pulley 37. The second pulley 37 is rotated by the cable 104 as the cable 104 passes thereover. The second pulley 37 guides the cable 104 and maintains tension within the endless loop 106. In some instances, the belt 102 may also interact with the second pulley 37 when the endless loop 106 is in certain positions relative to the rail 18. For instance, the belt 102 may contact, or even extend around at least a portion of the second pulley 37, when the movable barrier 24 is in the closed position. However, interaction between the second pulley 37 and the belt 102 may not be needed for operation of the movable barrier system 10. In an embodiment, the belt 102 does not interact with the second pulley 37.

The endless loop 106 has a length L, as measured with the endless loop 106 installed around the pulleys 36 and 37 under normal operating tension. The length L is a distance from one point along the endless loop 106 back to that same point. The belt 102 has a belt length $L_B$ that is less than the entire length L of the endless loop 106. The belt length $L_B$ is greater than or equal to a total displacement length $L_D$ of the trolley 20 between the first and second endpoints. In an embodiment, the belt length $L_B$ may be greater than or equal to $n\pi d$, where n is a number of revolutions of the pulley 36 required to move the trolley 20 between the first and second endpoints (to raise and lower the movable barrier 24), and d is the effective interfacing diameter of the pulley 36 and the belt 102. When $n\pi d$ is greater than or equal to the total displacement length $L_D$, and with proper installation of the endless loop 106 relative to the pulley 36, the belt 102 always remains in drivable contact with the pulley 36. In an embodiment, $L_B$ is at least 101% nπd, such as at least 105% nπd, such as at least 110% nπd. Excess belt 102 beyond nπd (i.e., $L_B$>nπd) allows for use of the endless loop 106 without causing the hardware 120 or 128 to contact the pulley 36 at the endpoints of travel which may occur if $L_B$ is equal or less than nπd.

The cable 104 has a cable length $L_C$ that is approximately equal to the entire length L of the endless loop 106 minus the belt length $L_B$. The cable length $L_C$ is intended to refer to an effective length of the cable 104, i.e., a distance between the hardware 120 and the first attachment structure 124 of the trolley 20, and not the total length of the cable 104 which can include looped back ends of the cable 104 that connect the cable 104 to the hardware 120 and trolley 20. In an embodiment, the cable length $L_C$ may be less than L-$L_B$ to account for a first gap $G_1$ disposed between the first end 110 of the belt 102 and the first end 114 of the cable 104 and a second gap $G_2$ disposed between the second end 112 of the belt 102 and the second end 116 of the cable 104. The first gap $G_1$ may be disposed between the first ends 110 and 114 of the belt 102 and the cable 104 as a result of a distance $D_{G1}$ occupied by the first hardware 120. The second gap $G_2$ may occur between the second ends 112 and 116 of the belt 102 and cable 104 as a result of a distance $D_{G2}$ between the first and second attachment structures 124 and 126 and the hardware 128. In an embodiment, the entire length L of the endless loop 106 can be equal to, or approximately equal to, the belt length $L_B$+the cable length $L_C$+the distance $D_{G1}$ of the first gap $G_1$+the distance $D_{G2}$ of the second gap $G_2$ ($L=L_B+L_C+D_{G1}+D_{G2}$). Thus, the belt 102 can have a belt length $L_B=L-L_C+D_{G1}+D_{G2}$, and the cable 104 can have a cable length $L_C=L-L_B-D_{G1}-D_{G2}$.

In an embodiment, at least 10% of the length L of the endless loop 106 is formed by the cable 104, such as at least 15% of the length L of the endless loop 106 is formed by the cable 104, such as at least 20% of the length L of the endless loop 106 is formed by the cable 104, such as at least 25% of the length L of the endless loop 106 is formed by the cable 104, such as at least 30% of the length L of the endless loop 106 is formed by the cable 104, such as at least 35% of the length L of the endless loop 106 is formed by the cable 104, such as at least 40% of the length L of the endless loop 106 is formed by the cable 104, such as at least 45% of the length L of the endless loop 106 is formed by the cable 104, such as at least 48% of the length L of the endless loop 106 is formed by the cable 104. In another embodiment, no greater than 75% of the length L of the endless loop 106 is formed by the cable 104, such as no greater than 50% of the length L of the endless loop 106 is formed by the cable 104. Without being bound by any particular theory, it is believed that use of the cable 104 in the endless loop 106 can reduce the environmental impact of the driving assembly 100 as compared to fully belted driving systems by reducing the amount of environmentally sensitive materials, and more particularly rubber or flexible/elastomeric plastic material, needed to form the endless loop 106. Instead of the entire endless loop 106 being formed from a belt material (including both a core and an outer layer formed from an environmentally sensitive material like rubber), the multi-segmented endless loop 106 described herein replaces more environmentally demanding materials with lesser environmentally demanding materials like metallic cable which may be recycled.

As previously described, the endless loop 106 is driven by the movable barrier operator 12 to raise and lower the movable barrier 24. FIG. 2 depicts the endless loop 106 in a position as seen when the movable barrier 24 is in or near the open position as evidenced by the position of the trolley 20 relative to the rail 18. During movement of the endless loop 106, the first and second interfaces 118 and 122 travel in opposite directions relative to one another. For example, the first interface 118 moves towards the movable barrier operator 12 while the second interface 122 moves away from the movable barrier operator 12 when the movable barrier 24 is moved from the open position (FIG. 2) to the closed position. Conversely, the first interface 118 moves away from the movable barrier operator 12 and the second interface 122 moves towards the movable barrier operator 12 when the movable barrier 24 is moved from the closed position to the open position.

Figure 3:
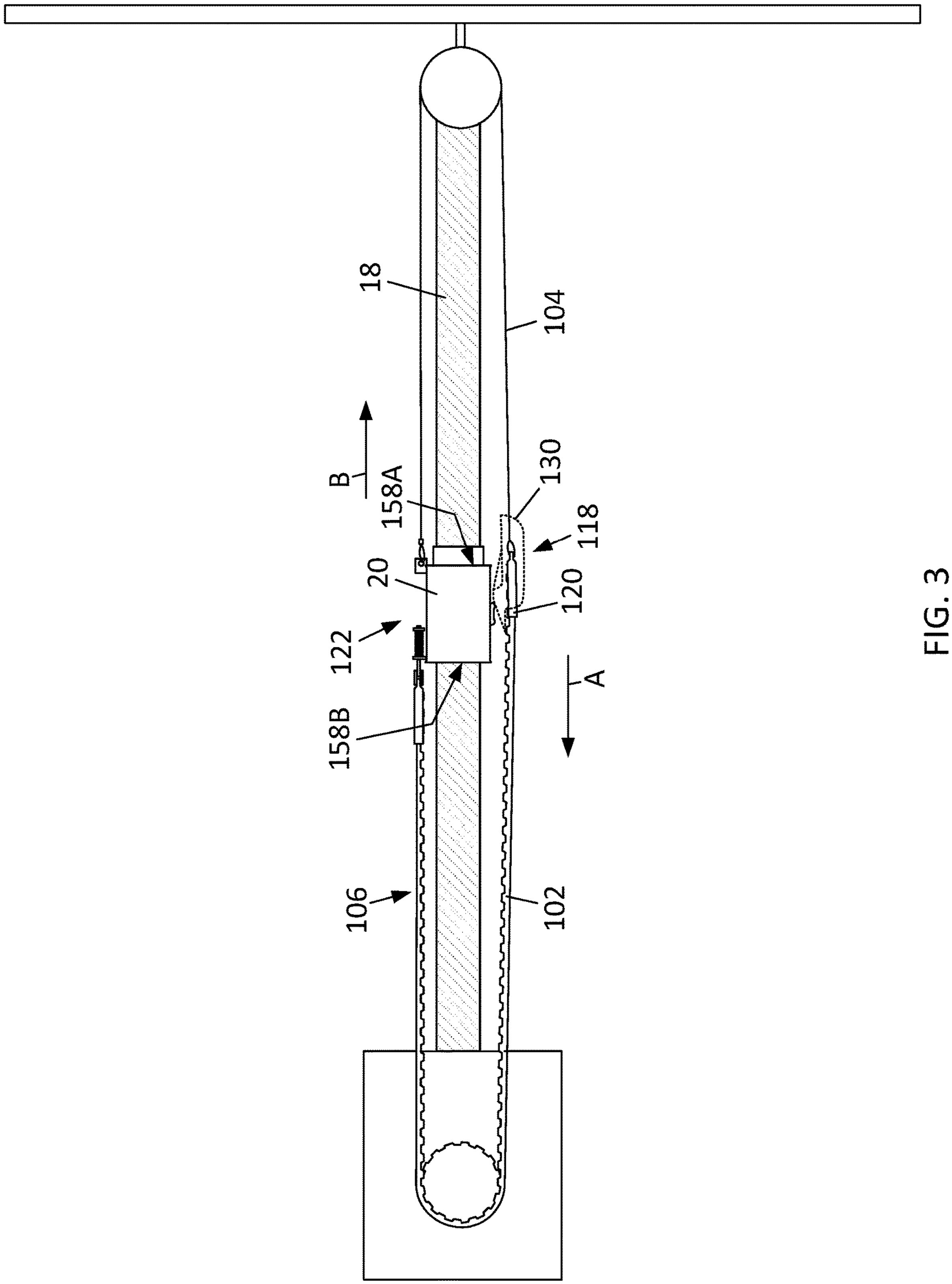
FIG. 3 is a schematic top view of the movable barrier system with the driving assembly of the movable barrier system in a second position in accordance with embodiments of the present disclosure.

Referring to FIG. 3, at or near a midpoint of travel of the trolley 20 along the rail 18 (i.e., when the movable barrier 24 is at or near a midpoint between open and closed positions), the first and second interfaces 118 and 122 pass by one another. When the movable barrier 24 is driven to the closed position, the first interface 118 moves in a first direction A and the second interface 122 moves in a second direction B opposite the first direction A. The first and second directions A and B are inverted when the movable barrier 24 is driven to the open position. In some instances, one or more features of the first and second interfaces 118 and 122 can interact with (contact) one another when passing. For example, the hardware 120 coupling the belt 102 and the cable 104 together can contact a projecting feature or a leading edge 158A of the trolley 20 as it passes by. In certain instances, this contact can result in the trolley 20 and the hardware 120 jamming with one another (becoming stuck), creating stress within the movable barrier system 10 and potentially damaging one or more components of the movable barrier system 10.

To mitigate the occurrence of jamming, a guide component 130 is coupled to the endless loop 106 at a location adjacent to the first interface 118. As described below, the guide component 130 can guide the first interface 118 past the trolley 20 without jamming occurring between the first interface 118 and the trolley 20. In an embodiment, the guide component 130 can be in contact with and guide the first interface 118 along the rail 18 before contacting with the trolley 20. The guide component 130 deflects away from the rail 18 as the guide component 130 comes into contact with the trolley 20, causing the endless loop 106 to deflect. After passing the trolley 20, the guide component 130 can resume contact with the rail 18 as a result of internal tension within the endless loop 106. This same process occurs when the endless loop 106 moves in both the clockwise direction and the counterclockwise direction.

Referring to FIGS. 2, 4, 5 and 6, the guide component 130 includes a body 132 that is coupled to the endless loop 106 at or adjacent to the first interface 118. In an embodiment, the body 132 has a single-piece construction. In another embodiment, the body 132 can be formed from a plurality of components, e.g., coupled together by one or more fasteners or through a hinged or snap-fit interface. The body 132 can be formed from a polymer, a metal, an alloy, a ceramic, or any combination thereof. In an embodiment, the body 132 is formed by a molding process, such as an injection molding process however other processes may be used such as 3D additive printing.

The body 132 can include a hollow tuboid sidewall 134. The tuboid sidewall 134 can define an aperture 136 extending between opposite longitudinal ends of the tuboid sidewall 134. In an embodiment, lateral sides of the aperture 136 can be fully closed by the tuboid sidewall 134. In another embodiment, the aperture 136 can have an opening (not illustrated) extending through a lateral face of the tuboid sidewall 134. In some instances, the opening extending through the lateral face of the tuboid sidewall 134 can be sized to allow the hardware 120, or at least the cable 104, to translate into the aperture 136 laterally through the opening when the guide component 130 is installed on the endless loop 106 as described in greater detail below. The aperture 136 can define an axis 138 that is oriented parallel, or generally parallel, with the endless loop 106 at the location where the guide component 130 is coupled to the endless loop 106.

The body 132 includes a guide surface 140. The guide surface 140 guides the endless loop 106 along the rail 18 and over the trolley 20 when the endless loop 106 is operating in the movable barrier system 10 in a normal operating state. The movable barrier system 10 is in the normal operating state when the endless loop 106 is properly aligned and oriented with respect to the rail 18 and the pulleys 36 and 37, i.e., the endless loop 106 is not twisted or sagging.

The guide surface 140 can include a first guide surface 142 and a second guide surface 144. The first guide surface 142 has an angled ramp contour that can guide the guide component 130 past the leading edge 158A of the trolley 20 in a first direction of travel. The second guide surface 144 has another angled ramp contour that can guide the guide component 130 past the leading edge 158B of the trolley 20 in a second direction of travel opposite the first direction.

In an embodiment, the first guide surface 142 lies along a best fit line 146 (FIG. 5) that intersects the axis 138 of the body 132 at a first ramp angle $\alpha_1$. The first ramp angle $\alpha_1$ can be at least 5°, such as at least 10°, such as at least 15°, such as at least 20°, such as at least 25°, such as at least 30°. The second guide surface 144 can define a second ramp angle $\alpha_2$, as measured with respect to the axis 138, that is the same or different as compared to the first ramp angle $\alpha_1$ of the first guide surface 142. The first and second ramp angles $\alpha_1$ and $\alpha_2$, combined with the length of the first and second guide surfaces 142 and 144, prevent the trolley 20 or any feature projecting from the trolley 20 from getting under the first and second guide surfaces 142 and 144 and jamming with the guide component 130. In an embodiment, leading edges 146A and 146B of the first and second guide surfaces 142 and 144, respectively, can be tapered, e.g., rounded, to further prevent jamming and to guide the guide component 130 relative to the rail 18 and trolley 20.

Figure 5:
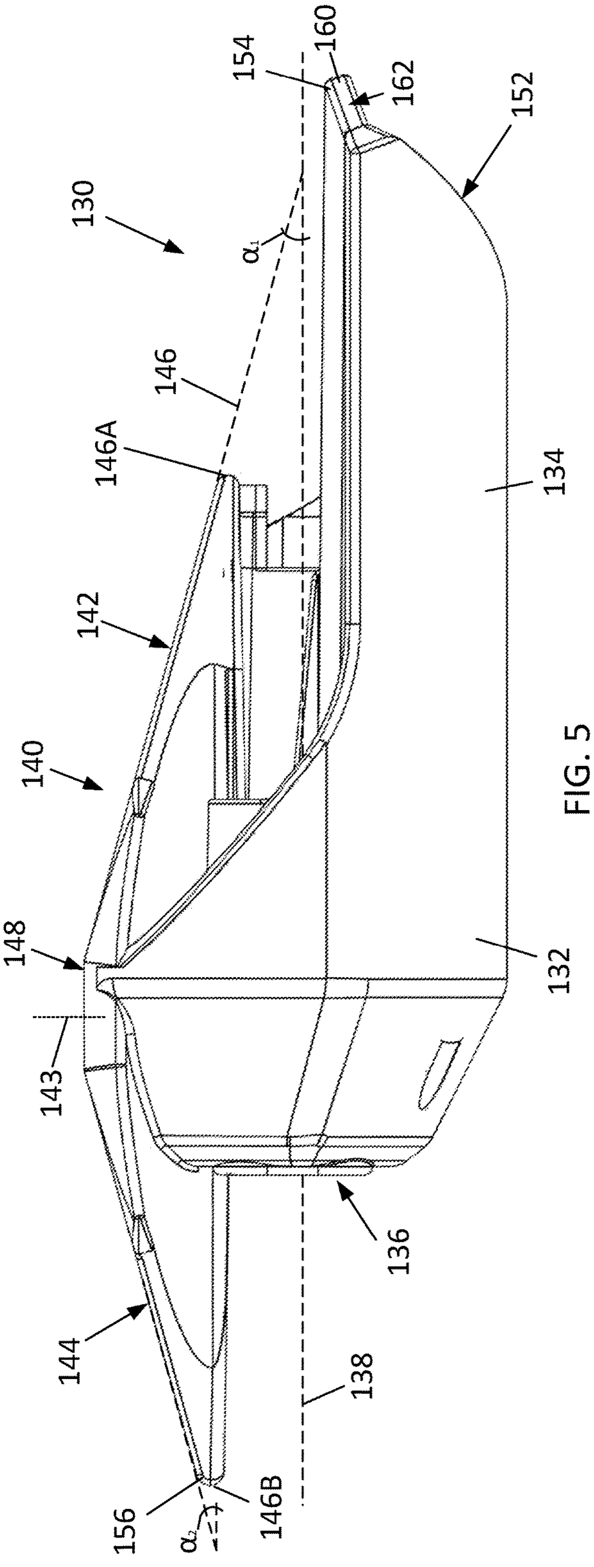
FIG. 5 is a first side view of the guide component in accordance with embodiments of the present disclosure.
Figure 6:
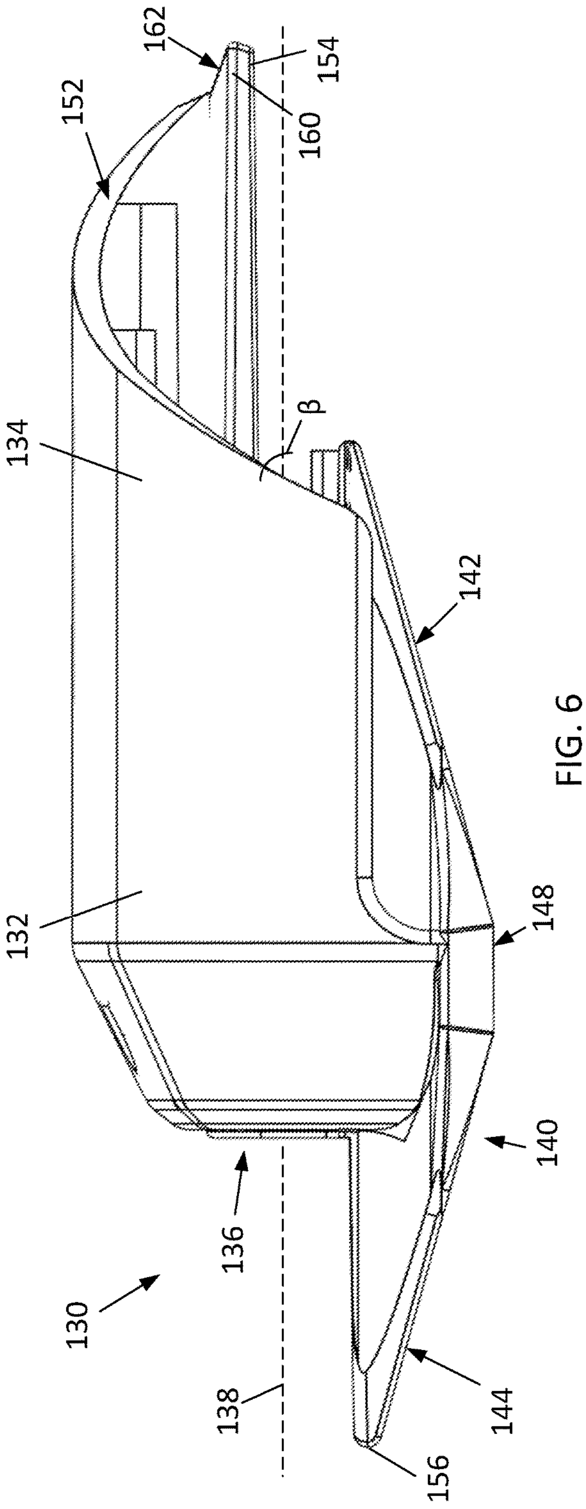
FIG. 6 is a second side view of the guide component in accordance with embodiments of the present disclosure.

In an embodiment, the first guide surface 142 can have a side profile with a linear (straight) taper, such as depicted in FIGS. 5 and 6. In another embodiment, the side profile of the first guide surface 142 can have a different taper shape, such as an arcuate taper including one or more radii of curvature, a stepped taper including a plurality of stepped surfaces, a multi-linear taper including a plurality of straight segments oriented at different relative angles, a curvilinear taper, or any combination thereof. In an embodiment, the second guide surface 144 can have the same side profile as the first guide surface 142. In another embodiment, the second guide surface 144 can have a different side profile as compared to the side profile of the first guide surface 142.

In an embodiment, the first and second guide surfaces 142 and 144 are reflectively symmetrical with one another about a centerline 143. In another embodiment, the first and second guide surfaces 142 and 144 can have different lengths as compared to one another, different ramp angles as compared to one another, different shapes as compared to one another, or any combination thereof.

In an embodiment, the first and second guide surfaces 142 and 144 abut each other, e.g., at the centerline 143. In another embodiment, the first and second guide surfaces 142 and 144 are spaced apart from each other by a transition surface 148. In an embodiment, the transition surface 148, or a best fit line of the transition surface 148, can be oriented parallel, or substantially parallel, with respect to the axis 138 of the body 132. In an embodiment, the transition surface 148 can be a rounded corner with a radius of curvature connecting the first and second guide surfaces 142 and 144. In another embodiment, the transition surface 148 is a chamfered surface connecting the first and second guide surfaces 142 and 144. The transition surface 148 can mitigate the buildup of stress that might otherwise occur at a sharp interface between abutting first and second guide surfaces 142 and 144 upon repeatedly contacting the trolley 20 as the first interface 118 passes by the trolley 20.

Figure 4:
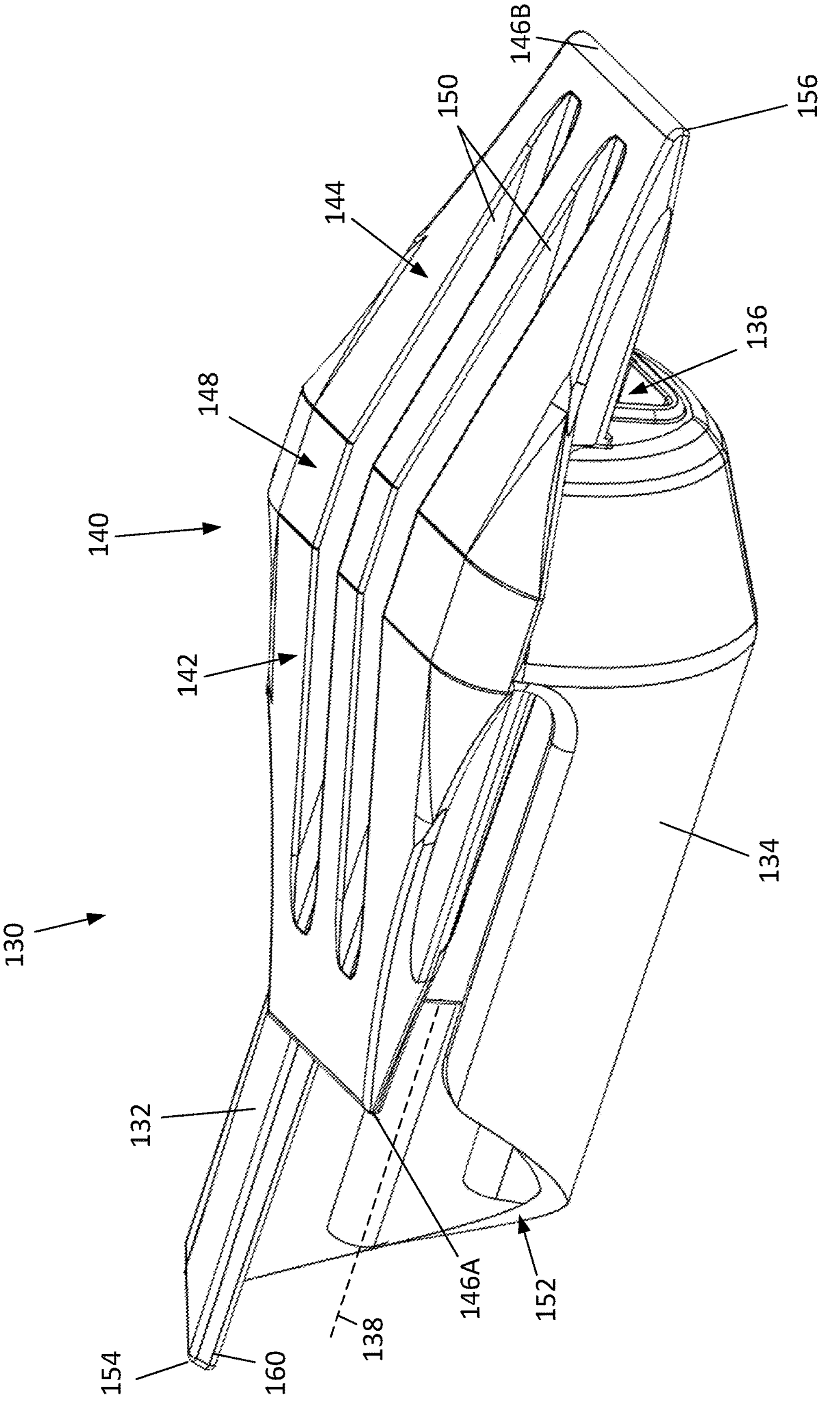
FIG. 4 is a perspective view of a guide component for use with the movable barrier system in accordance with embodiments of the present disclosure.

In an embodiment, the guide surface 140 includes one or more channels 150 recessed into the guide component 130 (FIG. 4). The channels 150 can extend along the guide surface 140 in a direction oriented parallel, or generally parallel, with the axis 138 of the guide component 130. In an embodiment, the channels 150 can extend continuously through the first and second guide surfaces 142 and 144 and the transition surface 148.

Figure 7:
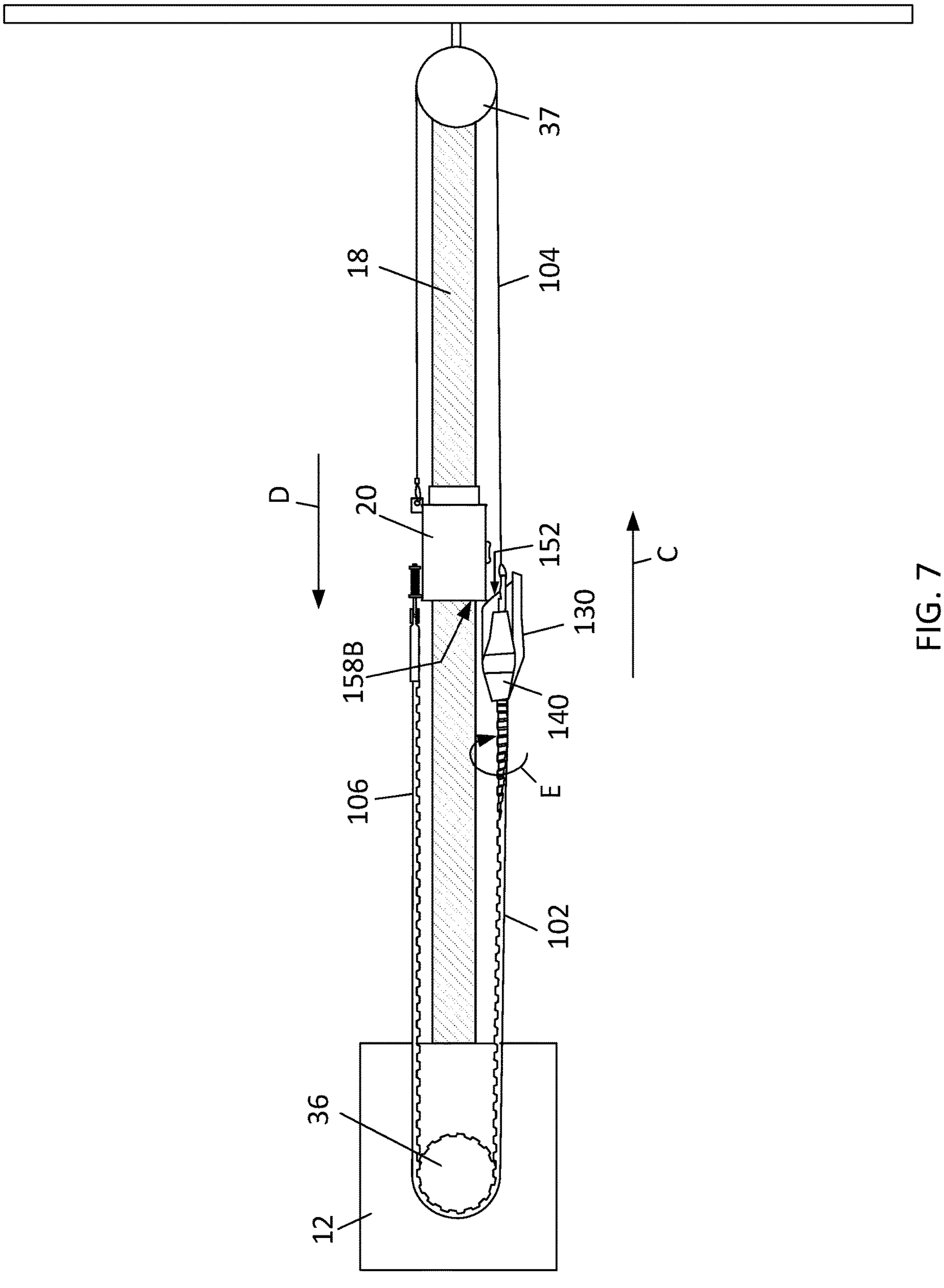
FIG. 7 is a schematic top view of the movable barrier system with the driving assembly of the movable barrier system in a third position in accordance with embodiments of the present disclosure.

Because of the construction of the cable 104 (including twisted or braided wires), rotational force may be exerted on the belt 102 at the first interface 118 by the cable 104. Cables 104 formed by twisted wires typically exhibit rotational memory that is expressed at the ends of the cable and transmitted to connected components. When cables 104 are used in movable barrier systems 10 they tend to impart rotational (unwinding) forces to the belt 102. For example, predominantly left-hand twisted cables 104 tend to impart right-hand twist at their ends. Conversely, predominantly right-hand twisted cables 104 tend to impart left-hand twist at their ends. These twisting forces may cause the belt 102 to twist, such as shown in FIG. 7, particularly when the first interface 118 is displaced far from the pulley 36, like encountered when the movable barrier 24 is in the open position, and the rotationally stabilizing presence of the pulley 36 is a large distance away. When the endless loop 106 is operating in the normal operating state, any such twisting is generally prevented by the guide surface 140 of the guide component 130 and the structural integrity of the belt 102. However, when the endless loop 106 is operating in the twisted state, the guide surface 140 may not be sufficient to rotationally displace the endless loop 106 back to the normal operating state.

Twisting of the endless loop 106, and more particularly twisting of the belt 102, is generally preventable during normal operating use. The combination of the guide surface 140 of the guide component 130 and the structural integrity of the belt 102 maintains the belt 102 in the normal (untwisted) operating state. However, there are instances when the endless loop 106, and more particularly the belt 102, can become twisted. For example, if the movable barrier system 10 is improperly installed (e.g., the rail 18 is misaligned relative to the movable barrier operator 12 or movable barrier 24, tension in the movable barrier system 10 is improperly calibrated, the trolley 20 gets jammed with the hardware 120, or the like) or the movable barrier 24 contacts with an object in its path during raising or lowering, the rail 18 may bow from its normal (straight) state. As a result, tension in the endless loop 106 at least temporarily lessens, allowing the endless loop 106 to sag. As a result, the belt 102 can experience twisting forces under loading from the cable 104 without the guide surface 140 or the structural integrity of the belt 102 maintaining the belt 102 in the normal operating state. After tension is restored in the endless loop 106, e.g., by addressing the issue that caused bowing, and the rail 18 returns to its normal (straight) state, the belt 102 can sometimes remain twisted relative to the normal operating state, such as shown in FIG. 7. This twisting is undesirable as it can cause the belt 102 to become tangled or misaligned with one or both of the pulleys 36 or 37, create overtension in the endless loop 106 reducing operational lifespan of the movable barrier system 10, and create jamming issues between the first interface 118 and the trolley 20. Moreover, twisting of the belt 102 is aesthetically unpleasant and perceived as low quality.

In the twisted operating state, the guide surface 140 has no, or minimal, contact with the rail 18 and trolley 20. As a result, the guide surface 140 cannot reorient the belt 102 to the normal (untwisted) operating state. While twisting in the endless loop 106 can be manually addressed by untwisting the endless loop 106, such untwisting operations would require that a person utilize a ladder or elongated object, such as a stick or broom handle, to reach the endless loop 106 and that the person have sufficient strength to untwist the endless loop 106 without damaging the endless loop 106. Moreover, it is likely the person would remove the driving assembly 100 described herein and replace it with a traditional fully belted drive system after having to manually untwist the endless loop 106 more than once.

To mitigate the need for human involvement when the endless loop 106 experiences twisting, the guide component 130 can automatically reorient the belt 102 from the twisted operating state to the normal operating state by way of an adjustment surface 152. Automatic reorientation from the twisted operating state to the normal operating refers to a reorientation operation that occurs without requiring a person to contact the endless loop 106 or the guide component 130. Automatic reorientation occurs while the movable barrier system 10 is normally operated, i.e., when the driving assembly 100 is actively driven by the movable barrier operator 12 to move the movable barrier 24 between different positions. As described below, the guide component 130 can reorient the belt 102 from the twisted operating state to the normal operating state during one or more passes of the guide component 130 by an interactable feature of the movable barrier system 10, such as the trolley 20.

In an embodiment, the adjustment surface 152 of the guide component 130 is a helical surface extending in a circumferential direction about the axis 138. In an embodiment, the adjustment surface 152 extends around at least 5% of the axis 138 of the body 132 in a circumferential direction, such as around at least 10% of the axis 138, such as around at least 15% of the axis 138, such as around at least 20% of the axis 138, such as around at least 25% of the axis 138, such as around at least 30% of the axis 138, such as around at least 35% of the axis 138, such as around at least 40% of the axis 138, such as around at least 45% of the axis 138, such as around at least 50% of the axis 138, such as around at least 55% of the axis 138, such as around at least 60% of the axis. In another embodiment, the adjustment surface 152 can extend around less than 100% of the axis of the body 132 in the circumferential direction, such as less than 95% of the axis 138, such as less than 90% of the axis 138, such as less than 85% of the axis 138, such as less than 80% of the axis 138, such as less than 75% of the axis 138, or less than 70% of the axis 138.

Referring to FIG. 6, the adjustment surface 152 can have an average pitch angle β, as measured relative to the axis 138, in a range of 1° and 90°, such as in a range of 10° and 80°, such as in a range of 20° and 70°, such as in a range of 30° and 60°. In an embodiment, the pitch angle β of the adjustment surface 152 is uniform, or substantially uniform, along the entire length of the adjustment surface 152. In another embodiment, the pitch angle β of the adjustment surface 152 varies along the length of the adjustment surface 152. For example, the adjustment surface 152 can include different angled sections or a stepped profile.

In an embodiment, the body 132 of the guide component 130 can define first and second longitudinal ends 154 and 156 with the adjustment surface 152 disposed at or adjacent to the first longitudinal end 154. The adjustment surface 152 can extend from the first longitudinal end 154 of the body 132 of the guide component 130 towards the second longitudinal end 156 of the body 132 of the guide component 130. The guide surface 140 can extend between the first and second longitudinal ends 154 and 156, such as from the second longitudinal end 156 of the body 132 of the guide component 130 towards the first longitudinal end 154 of the body 132 of the guide component 130.

In an embodiment, the guide surface 140 and the adjustment surface 152 are staggered from each other in a circumferential direction about the axis 138 of the body 132. In some instances, the guide surface 140 and the adjustment surface 152 can be rotationally staggered to not overlap in the circumferential direction about the axis 138. In other instances, the guide surface 140 and the adjustment surface 152 can partially overlap one another in the circumferential direction about the axis 138. Staggered arrangement between the guide surface 140 and the adjustment surface 152 allows for contact of only one of the guide surface 140 or the adjustment surface 152 with the rail 18 or trolley 20 at a given time. When the guide surface 140 is in contact with the rail and trolley 20, the endless loop 106 is in the normal operating state. When the adjustment surface 152 is in contact with the trolley 20, the guide component 130 is in the twisted operating state and, during movement of the guide component 130, being automatically reoriented to the normal operating state by countertwisting imparted by the adjustment surface 152 contacting the interactable feature.

Referring to FIG. 7, when the movable barrier 24 is moved, e.g., raised, by the movable barrier operator 12, the guide component 130 moves in a direction C away from the movable barrier operator 12. Simultaneously, the trolley 20 moves in a direction D towards the movable barrier operator 12. As the adjustment surface 152 of the guide component 130 contacts the leading edge 158B of the trolley 20 (or another interactable feature of the trolley 20 or movable barrier system 10, all collectively referred to hereinafter as the leading edge 158B of the trolley 20) and continues moving in direction C, the interaction between the adjustment surface 152 and the leading edge 158B causes the guide component 130 to rotate in direction E. That is, force between the adjustment surface 152 and the leading edge 158B of the trolley 20 causes the guide component 130 to rotate in direction E towards the normal operating state. Total angular displacement of the guide component 130 in direction E is at least partially controlled by the pitch angle β of the adjustment surface 152 and how far the adjustment surface 152 extends around the axis 138 in the circumferential direction. For example, steep pitch angles β (e.g., pitch angles less than 20°) and short adjustment surfaces 152 may result in minimal rotational displacement in direction E each time the adjustment surface 152 passes by the trolley 20. Conversely, shallow pitch angles β and long adjustment surfaces 152 may result in large amounts of rotational displacement in direction E each time the adjustment surface 152 passes by the trolley 20. However, excessively shallow pitch angles β create too much resistance between the adjustment surface 152 and the leading edge 158B of the trolley 20 which can cause jamming or result in premature wear of the driving assembly 100.

In an embodiment, the adjustment surface 152 can be configured to rotate the guide component 130 in the direction E by at least 30° each time the adjustment surface 152 interacts with the leading edge 158B of the trolley 20, such as at least 45° each time the adjustment surface 152 interacts with the leading edge 158B of the trolley 20, such as at least 60° each time the adjustment surface 152 interacts with the leading edge 158B of the trolley 20, such as at least 90° each time the adjustment surface 152 interacts with the leading edge 158B of the trolley 20. Each successive interaction between the adjustment surface 152 and the leading edge 158B of the trolley 20 causes the guide component 130 to rotate in the direction E by a same, or approximately same, rotational displacement.

By way of non-limiting example, if the belt 102 is twisted by 180° in the twisted operating state and the adjustment surface 152 was configured to rotate the guide component 130 in the direction E by approximately 90° each time the adjustment surface 152 interacts with the leading edge 158B of the trolley 20, two passes of the guide component 130 relative to the trolley 20 in the corrective direction would fully untwist the belt 102. That is, the movable barrier operator 12 would raise the movable barrier 24 twice before the endless loop 106 could be returned to the normal operating state. If, instead, the belt 102 is twisted 90°, the movable barrier operator 12 would only raise the movable barrier 24 once before the endless loop 106 could be returned to the normal operating state.

Due to tension requirements in the endless loop 106 in the normal operating state, twisting of the endless loop 106 typically only entails one pass of the adjustment surface 152 relative to the trolley 20 to restore the endless loop 106 to the normal operating state. That is, the adjustment surface 152 is shaped and sized to untwist the endless loop 106 in most instances using a single pass. However, in some extreme instances, two passes may be employed to return the endless loop 106 to the normal operating state.

The guide component 130 can further include an anti-lock feature 160 that prevents the guide component 130 from jamming with the trolley 20 as the guide component 130 passes by the trolley 20. The anti-lock feature 160 can include a projection extending from the first longitudinal end 154 of the body 132. In an embodiment, the anti-lock feature 160 is disposed immediately adjacent to the adjustment surface 152, such as at an end of the adjustment surface 152. A guide surface 162 of the anti-lock feature 160 can be in communication with the adjustment surface 152 and effectively extend the adjustment surface 152 around the circumference of the axis 138 while also providing a lip that catches the leading edge 158B and prevents the adjustment surface 152 from missing the leading edge 158B of the trolley 20 and becoming jammed relative therewith. Moreover, while twisting of the belt 102 is usually predictable and occurs within a finite angular rotational displacement range, in some instances the belt 102 may be twisted slightly greater than usual, e.g., when the endless loop 106 is overtensioned during installation, resulting in the adjustment surface 152 missing the leading edge 158B of the trolley 20. The anti-lock feature 160 prevents the tip of the adjustment surface 152 from locking on to (jamming with) the leading edge 158B of the trolley 20 when the belt 102 is twisted outside of the known finite angular displacement range by guiding the adjustment surface 152 onto the leading edge 158B of the trolley 20.

In an embodiment, the guide component 130 is installed on the endless loop 106 prior to installation of the driving assembly 100 in the movable barrier system 10, i.e., when the endless loop 106 is discontinuous and not coupled to the first and second attachment structures 124 and 126. For example, the guide component 130 may be installed on the endless loop 106 (or a segment of the endless loop 106) by the manufacturer or by an installer prior to installing the driving assembly 100 in the movable barrier system 10. The guide component 130 may be installed on the endless loop 106 before or after the cable 104 is coupled to the hardware 120. The following description provides a non-limiting example of a method of installing the guide component 130 on the endless loop 106 in accordance with an embodiment.

In an embodiment, the guide component 130 is coupled to the hardware 120 after the belt 102 is already coupled to the hardware 120 but before the cable 104 is coupled to the hardware 120. Initially, the guide component 130 can be installed on the endless loop 106 by aligning the axis 138 of the aperture 136 of the guide component 130 with the hardware 120 and sliding the guide component 130 onto the hardware 120 in a direction parallel with the axis 138. The hardware 120 slides into the aperture 136 until reaching a prescribed relative position with respect to the guide component 130 at which point the hardware 120 can be coupled to the guide component 130 to couple the guide component 130 to the belt 102.

Figure 8:
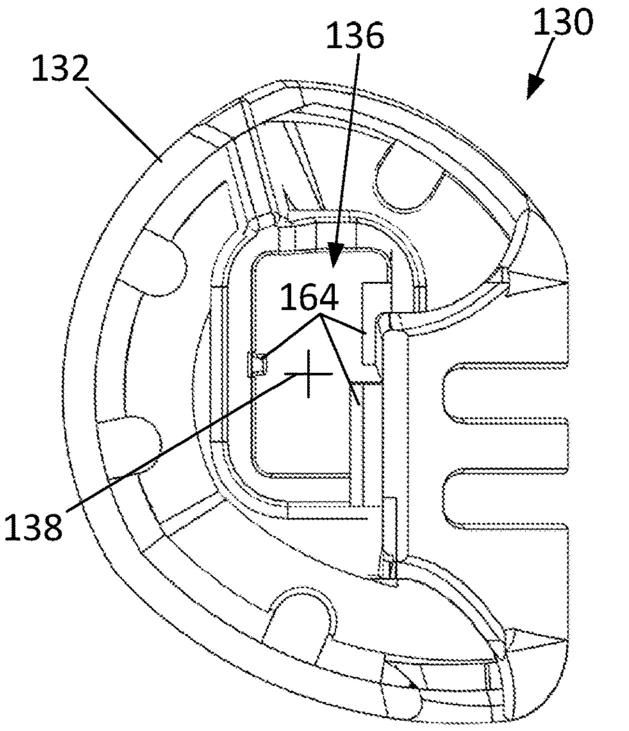
FIG. 8 is a first end view of the guide component in accordance with embodiments of the present disclosure.
Figure 9:
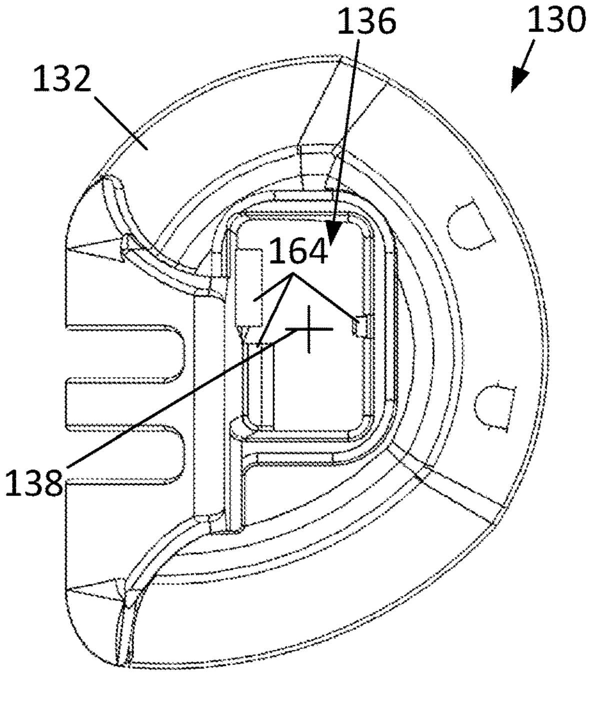
FIG. 9 is a second end view of the guide component in accordance with embodiments of the present disclosure.

Referring to FIGS. 8 and 9, the aperture 136 extending through the body 132 of the guide component 130 is generally sized and shaped to receive the endless loop 106. In an embodiment, the aperture 136 is sized and shaped to receive the hardware 120, such as the belt termination bracket. The hardware 120 may be installed within the aperture 136 by translating the hardware 120 and body 132 together relative to one another along the axis 138. The hardware 120 can slide into the aperture 136 until reaching a prescribed relative position with respect to the aperture 136. Once disposed at the prescribed relative position, the hardware 120 and guide component 130 may be coupled together to retain the guide component 130 at a fixed location relative to the hardware 120. The hardware 120 can be coupled to the guide component 130 via a permanent attachment protocol such as an adhesive, or a releasable attachment protocol, such as a threaded fastener or pin. In an embodiment, the hardware 120 is coupled to the guide component 130 by interfacing one or more rapid engagement interfaces of the guide component 130 with one or more complementary features of the hardware 120. The rapid engagement interfaces may allow for quick attachment between the hardware 120 and the guide component 130. For example, the rapid engagement interfaces can include snap fit features (e.g., posts 164) disposed on the guide component 130 that automatically interface with complementary features (e.g., recesses) in the hardware 120 when the hardware 120 is inserted into the aperture 136 and reaches the prescribed relative position.

In an embodiment, the releasable attachment protocol can provide a user with an indication when the hardware 120 is at the prescribed relative position. For example, the posts 164 may provide an audible indication when snapping into the recesses. The guide component 130 and hardware 120 may also, or alternatively, provide tactile feedback in the form of a snap, a click, or another tactile indication to the installer when the snap features and complementary features are interfaced with one another.

Referring again to FIGS. 2, 4, 5 and 6, once the guide component 130 is coupled to the hardware 120, the cable 104 can be coupled to the hardware 120 to form a discontinuous endless loop 106 where the free second ends 112 and 116 of the belt 102 and the cable 104 are not yet connected to the trolley 20. The discontinuous endless loop 106 can then be installed on the movable barrier system 10 by coupling the free second ends 112 and 116 of the belt 102 and the cable 104 to the trolley 20 to form the continuous endless loop 106. The embodiment described above is intended as an example and is not intended to limit the scope of the disclosure. In another embodiment, the guide component 130 can be coupled to the endless loop 106 after the cable 104 is coupled to the hardware 120. The cable 104 can be fed through the aperture 136 until the guide component 130 reaches the hardware 120, at which point the hardware 120 is translated into the aperture 136 as described above. In another embodiment, the guide component 130 can be coupled to the hardware 120 before the belt 102 is coupled to the hardware 120.

In certain instances, it may be desirable to remove the guide component 130 from the endless loop 106 or remove the guide component 130 from the hardware 120 while maintaining the guide component 130 engaged with the endless loop 106. For example, the guide component 130 may be removable from the endless loop 106 or moved relative to the hardware 120 to permit repair and maintenance of the endless loop 106, repair or replacement of the guide component 130, repair or adjustment to the hardware 120 or first interface 118, or the like. In an embodiment, removing the guide component 130 from the endless loop 106 can be performed by biasing the guide component 130 in a direction along the axis 138 to uncouple the posts 164 of the guide component 130 from complementary recesses or receiving features in the hardware 120. The guide component 130 can then be translated along the axis 138 away from the hardware 120. In some instances, the guide component 130 can be supported by the endless loop 106, e.g., the cable 104, in this state. In other embodiments, the guide component 130 can be removed from the endless loop 106 by undoing or detaching a fastening component that selectively couples the guide component 130 to the endless loop 106. In some instances, the guide component 130 can be removed from the endless loop 106 while the endless loop 106 is under full operating tension. In other instances, the guide component 130 can be removed from the endless loop 106 only after tension in the endless loop 106 is released, or partially released, e.g., by releasing tension at the tensioner spring assembly of the second attachment structure 126 or removing the endless loop 106 from the movable barrier system 10.

Figure 10:
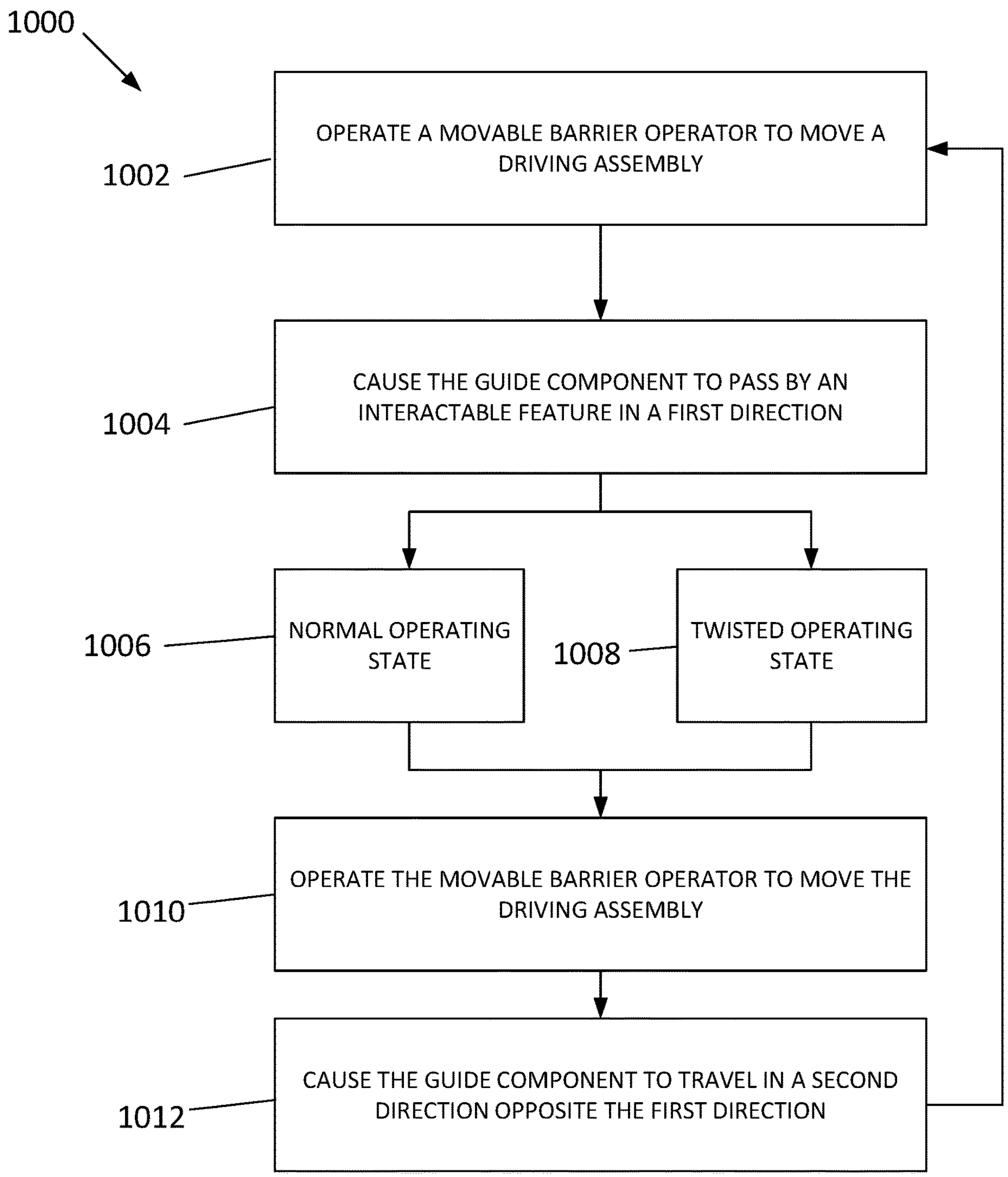
FIG. 10 is a flow chart of a method of operating a driving assembly to adjust a relative position of a movable barrier in a movable barrier system in accordance with embodiments of the present disclosure.

As described above, the guide component 130 allows the endless loop 106 to operate in a normal operating state. When the endless loop 106 is already in the normal operating state, the guide component 130 assists in maintaining the normal operating state. When the endless loop 106 is in a twisted operating state, the guide component 130 assists in reorienting the endless loop 106 to return the endless loop 106 to the normal operating state. FIG. 10 illustrates a flowchart of a method 1000 of operating a driving assembly, such as the driving assembly 100, to adjust a relative position of a movable barrier, such as the movable barrier 24, in a movable barrier system, such as the movable barrier system 10, in accordance with an embodiment.

The method 1000 is performed with the driving assembly installed in the movable barrier system and coupled to both the movable barrier and a movable barrier operator, such as the movable barrier operator 12. The method 1000 includes operating 1002 the movable barrier operator to move the driving assembly in a first direction. Operating 1002 the movable barrier operator may be performed by driving an implement, such as the pulley 36, operably coupled to the driving assembly. The implement may be driven by a motor of the movable barrier operator. The movable barrier operator can cause a motor of the movable barrier operator to drive the implement in response to receiving a signal from a controller, such as a wired wall controller, a wireless controller, a security system, a mobile device (such as a smartphone), or the like. The driving assembly includes an endless loop formed from a belt, such as the belt 102, and a cable, such as the cable 104. A guide component, such as the guide component 130, is disposed adjacent to an interface formed between the belt and the cable. As the driving assembly is moved by the implement in the first direction, the guide component guides the endless loop along a rail, such as the rail 18, of the movable barrier system. During at least a portion of this movement, the guide component contacts and slides along the rail.

The method 1000 further includes causing 1004 the guide component to pass by an interactable feature. This can occur as a result of operating 1002 the movable barrier operator. The interactable feature may be a trolley, such as the trolley 20, moving along the rail in an opposite direction of the guide component. In an embodiment, the interactable feature is a leading edge, such as the leading edge 158B, of the trolley. As the guide component passes the trolley in the first direction, a guide feature, such as the guide surface 140, of the guide component interacts with the trolley to prevent the driving assembly from becoming stuck relative to the trolley. In some instances, tension in the driving assembly increases while the guide component passes by the trolley as a result of displacement of the guide component away from the trolley and rail. Once the guide component is past the trolley, the guide feature can again contact the rail and guide the guide component along the rail.

In some instances, the endless loop is in the normal (untwisted) operating state 1006 as the guide component passes by the interactable feature. As such, the guide component is positioned in an orientation that causes the guide feature of the guide component to translate past the trolley without altering the rotational orientation of the endless loop.

In other instances, the endless loop is in a twisted operating state 1008 as the guide component passes by the interactable feature. In the twisted operating state 1008, an adjustment feature, such as the adjustment surface 152, of the guide component interacts with the interactable feature to cause the endless loop to rotate towards the normal (untwisted) operating state.

After the guide component passes by the interactable feature, the endless loop can continue moving in the first direction until the movable barrier reaches its destination. Sometime after the movable barrier reaches its destination, the method 1000 includes operating 1010 the movable barrier operator to again move the driving assembly. Similar to step 1002, this can occur as a result of a request to raise or lower the movable barrier, e.g., from a wired wall controller, a wireless controller, a security system, a mobile device (such as a smartphone), or the like. Operating 1010 the movable barrier operator may be performed by driving the implement in the opposite direction as compared to the direction in step 1002. As a result of operating 1010 the movable barrier operator, the guide component is caused 1012 to travel in a second direction opposite the first direction. Regardless of the orientation of the guide component at step 1004, the guide component may now be oriented such that the guide feature of the guide component faces towards the trolley. The guide feature can guide the guide component past the trolley. After the guide component passes by the trolley, the endless loop can continue moving in the second direction until the movable barrier reaches its destination.

The method 1000 can then continue by operating 1002 the movable barrier operator to again move the driving assembly. In instances where the endless loop is returned to the normal operating state at step 1008, the method continues by continuously repeating steps 1002, 1004, 1006, 1010, and 1012 until such time that the endless loop again becomes twisted. In instances where the endless loop is not returned to the normal operating state at step 1008, the method continues by repeating steps 1002, 1004, 1008, 1010, and 1012 an additional time. When the endless loop is finally returned to the normal operating state at step 1012, the method then continues by continuously repeating steps 1002, 1004, 1006, 1010, and 1012 until such time that the endless loop again becomes twisted.

Embodiments described herein allow for more environmentally friendly movable barrier systems by reducing the amount of environmentally sensitive materials in driving assemblies of the movable barrier system. Embodiments described herein can automatically untwist portions of the driving assembly that become twisted during use or as a result of an initial installation misalignment, thus allowing for optimal use and component lifespan without requiring specific action by the movable barrier operator to untwist the twisted driving assembly. Embodiments described herein allow components of movable barrier systems to be guided past one another without jamming. Embodiments described herein may reduce cost associated with movable barrier systems.

Further aspects of the invention are provided by one or more of the following embodiments:

Embodiment 1. A driving assembly to be driven by a movable barrier operator to adjust a relative position of a movable barrier, the driving assembly comprising: a belt a cable coupled to the belt; and a guide component disposed adjacent to a first interface between the cable and the belt.

Embodiment 2. The driving assembly of claim 1, wherein the guide component comprises a body including at least one of: a guide surface that guides the belt in a normal operating state as the driving assembly is driven by the movable barrier operator; or an adjustment surface that reorients the body to adjust the belt from a twisted operating state to the normal operating state as the driving assembly is driven by the movable barrier operator.

Embodiment 3. The driving assembly of claim 2, wherein the body comprises a hollow tuboid sidewall defining both the guide surface and the adjustment surface, and wherein at least one of the belt, the cable, or a portion of a hardware coupling the belt and cable together extends into an aperture in the hollow tuboid sidewall.

Embodiment 4. The driving assembly of claim 2, wherein the body has a first longitudinal end and a second longitudinal end, wherein the adjustment surface is disposed at the first longitudinal end, and wherein the guide surface extends between the first longitudinal end and the second longitudinal end.

Embodiment 5. The driving assembly of claim 2, wherein the guide surface and the adjustment surface are staggered from each other in a circumferential direction about an axis of the body.

Embodiment 6. The driving assembly of claim 2, wherein the guide surface comprises a first guide surface that guides the belt when the driving assembly is driven in a first direction and a second guide surface that guides the belt when the driving assembly is driven in a second direction opposite the first direction.

Embodiment 7. The driving assembly of claim 2, wherein the adjustment surface is helical.

Embodiment 8. The driving assembly of claim 2, wherein the body further comprises an anti-lock feature disposed adjacent to the adjustment surface.

Embodiment 9. The driving assembly of claim 2, wherein the belt and the cable are further coupled together through a trolley at a second interface, and wherein the adjustment surface is configured to interact with the trolley to reorient the body to adjust the belt to the normal operating state as the adjustment surface passes the trolley.

Embodiment 10. The driving assembly of claim 1, wherein a first end of the belt and a first end of the cable are coupled together via a hardware, wherein the guide component is coupled to the hardware, and wherein second ends of each of the cable and the belt are configured to be coupled to a trolley that is moveable along a rail and coupled to the movable barrier to adjust the position of the movable barrier as the driving assembly is driven by the movable barrier operator.

Embodiment 11. The driving assembly of claim 1, wherein the cable and belt form an endless loop, and wherein at least 30% of the endless loop is defined by the cable.

Embodiment 12. A method of operating a driving assembly to adjust a relative position of a movable barrier, the method comprising: operating a movable barrier operator to move the driving assembly, the driving assembly comprising an endless loop defined by a belt, a cable, and a guide component disposed at a first interface between the belt and the cable; and passing the guide component by an interactable feature in a first direction such that an adjustment surface of the guide component interacts with the interactable feature to adjust the belt from a twisted operating state to a normal operating state.

Embodiment 13. The method of claim 12, wherein adjusting the belt from the twisted operating state to the normal operating state entails passing the guide component by the interactable feature in the first direction no greater than twice.

Embodiment 14. The method of claim 12, wherein passing the guide component by the interactable feature occurs in the first direction and a second direction opposite the first direction, and wherein a guide surface of the guide component guides the guide component past the interactable feature in the first and second directions when the belt is in the normal operating state.

Embodiment 15. The method of claim 12, wherein passing the guide component by the interactable feature when the belt is in a twisted operating state causes the guide component to rotate approximately 180°.

Embodiment 16. The method of claim 12, wherein at least 30% of the endless loop is defined by the cable.

Embodiment 17. A guide component for a movable barrier system, the guide component comprising: a body including a tuboid sidewall extending between first and second longitudinal ends; a guide surface including a first guide surface and a second guide surface; and an adjustment surface configured to reorient the body to automatically reorient a belt portion of a driving assembly of the movable barrier system from a twisted operating state to a normal operating state as the driving assembly is driven by a movable barrier operator.

Embodiment 18. The guide component of claim 17, wherein the adjustment surface is helical, and wherein the adjustment surface is disposed at the first longitudinal end of the body.

Embodiment 19. The guide component of claim 17, wherein the tuboid sidewall defines an aperture including one or more snap features configured to interface with one or more complementary features of a hardware inserted into the aperture when the guide component is coupled to the belt of the driving assembly.

Embodiment 20. The guide component of claim 17, wherein the guide surface and the adjustment surface are staggered from each other in a circumferential direction about an axis of the body.

The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A driving assembly configured to be driven by a movable barrier operator to adjust a relative position of a movable barrier, the driving assembly comprising:

a belt;

a cable coupled to the belt; and a guide component disposed adjacent to a first interface between the cable and the belt, wherein the guide comprises a body including:

a guide surface that guides the belt in a normal operating state as the driving assembly is driven by the movable barrier operator; and an adjustment surface that reorients the body to adjust the belt from a twisted operating state to the normal operating state as the driving assembly is driven by the movable barrier operator.

2. The driving assembly of claim 1, wherein the adjustment surface is configured to adjust the belt from the twisted operating state to the normal operating state in two or fewer passes by a trolley of the movable barrier operator.

3. The driving assembly of claim 1, wherein the body comprises a hollow tuboid sidewall defining both the guide surface and the adjustment surface, and wherein at least one of the belt, the cable, or a portion of a hardware coupling the belt and cable together extends into an aperture in the hollow tuboid sidewall.

4. The driving assembly of claim 1, wherein the body has a first longitudinal end and a second longitudinal end, wherein the adjustment surface is disposed at the first longitudinal end, and wherein the guide surface extends between the first longitudinal end and the second longitudinal end.

5. The driving assembly of claim 1, wherein the guide surface and the adjustment surface are staggered from each other in a circumferential direction about an axis of the body.

6. The driving assembly of claim 1, wherein the guide surface comprises a first guide surface that guides the belt when the driving assembly is driven in a first direction and a second guide surface that guides the belt when the driving assembly is driven in a second direction opposite the first direction, and wherein the first and second guide surfaces are angularly offset from one another.

7. The driving assembly of claim 1, wherein the adjustment surface is helical.

8. The driving assembly of claim 1, wherein the body further comprises an anti-lock feature disposed adjacent to the adjustment surface.

9. The driving assembly of claim 1, wherein the belt and the cable are further coupled together through a trolley at a second interface, and wherein the adjustment surface is configured to interact with the trolley to reorient the body to adjust the belt to the normal operating state as the adjustment surface passes the trolley.

10. The driving assembly of claim 1, wherein a first end of the belt and a first end of the cable are coupled together via a hardware, wherein the guide component is coupled to the hardware, and wherein second ends of each of the cable and the belt are configured to be coupled to a trolley that is moveable along a rail and coupled to the movable barrier to adjust the position of the movable barrier as the driving assembly is driven by the movable barrier operator.

11. The driving assembly of claim 1, wherein the cable and belt form an endless loop, and wherein at least 30% of the endless loop is defined by the cable.

12. A driving assembly configured to be driven by a movable barrier operator to adjust a relative position of a movable barrier, the driving assembly comprising:

a belt;

a cable coupled to the belt, and a guide component disposed adjacent to a first interface between the cable and the belt, wherein the guide comprises a body including an adjustment surface that reorients the body to adjust the belt from a twisted operating state to a normal operating state as the driving assembly is driven by the movable barrier operator.

13. The driving assembly of claim 12, wherein the body comprises a hollow tuboid sidewall, and wherein at least one of the belt, the cable, or a portion of a hardware coupling the belt and cable together extends into an aperture in the hollow tuboid sidewall.

14. The driving assembly of claim 12, wherein the adjustment surface is configured to adjust the belt from the twisted operating state to the normal operating state in two or fewer passes by a trolley of the movable barrier operator.

15. The driving assembly of claim 14, wherein the adjustment surface is helical, and wherein the helical adjustment surface interacts with the trolley to adjust the belt from the twisted operating state to the normal operating state.

16. The driving assembly of claim 12, wherein the belt and cable form an endless loop, and wherein the belt and cable are coupled together at a second interface through a trolley, the trolley configured to move along a rail to move the movable barrier.

17. A driving assembly configured to be driven by a movable barrier operator to adjust a relative position of a movable barrier, the driving assembly including an endless loop comprising:

a guide component;

a belt having a first end and a second end opposite the first end;

a cable having a first end and a second end opposite the first end, wherein the first ends of the belt and cable are coupled together at a first interface, and wherein the second ends of the belt and cable are coupled together at a second interface;

wherein the guide component is disposed at the first interface, wherein the second interface is formed through a trolley movably coupled to a rail to raise and lower the movable barrier, wherein the guide component comprises a body including a guide surface that guides the belt in a normal operating state as the driving assembly is driven by the movable barrier operator, and wherein the body of the guide component further comprises an adjustment surface that reorients the body to adjust the belt from a twisted operating state to the normal operating state.

18. The driving assembly of claim 17, wherein the adjustment surface is helical.

19. The driving assembly of claim 17, wherein the body comprises a hollow tuboid sidewall defining the guide surface, and wherein at least one of the belt, the cable, or a portion of a hardware coupling the belt and cable together extends into an aperture in the hollow tuboid sidewall.

* * * * *